United States Patent
Li et al.

(10) Patent No.: US 12,411,019 B2
(45) Date of Patent: Sep. 9, 2025

(54) ROUTING WITH TRAFFIC LIGHT INFORMATION

(71) Applicant: GM Global Technology Operations LLC, Detroit, MI (US)

(72) Inventors: Chuan Li, Troy, MI (US); Vivek Vijaya Kumar, Shelby Township, MI (US); Donald K. Grimm, Utica, MI (US); Douglas C. Martin, Goodrich, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 18/535,077

(22) Filed: Dec. 11, 2023

(65) Prior Publication Data

US 2025/0189338 A1    Jun. 12, 2025

(51) Int. Cl.
*G01C 21/36*     (2006.01)
*G08G 1/01*       (2006.01)

(52) U.S. Cl.
CPC ....... *G01C 21/3691* (2013.01); *G08G 1/0133* (2013.01); *G08G 1/0145* (2013.01)

(58) Field of Classification Search
CPC . G01C 21/3691; G08G 1/0133; G08G 1/0145
See application file for complete search history.

(56) References Cited

U.S. PATENT DOCUMENTS

| | | | | |
|---|---|---|---|---|
| 9,805,595 | B1* | 10/2017 | Liebinger Portela | .. G08G 1/087 |
| 11,926,321 | B1* | 3/2024 | Rothschild | ........... G08G 1/0129 |
| 2003/0060977 | A1* | 3/2003 | Jijina | ............... G08G 1/096861 |
| | | | | 701/414 |
| 2010/0114466 | A1* | 5/2010 | Tomita | ............... G01C 21/3461 |
| | | | | 701/532 |
| 2015/0015421 | A1* | 1/2015 | Krijger | ........... G08G 1/096716 |
| | | | | 340/932 |
| 2016/0042639 | A1* | 2/2016 | Onishi | ................... G08G 1/123 |
| | | | | 701/117 |
| 2022/0307845 | A1* | 9/2022 | Gu | ..................... G01C 21/3492 |

FOREIGN PATENT DOCUMENTS

| | | |
|---|---|---|
| WO | 2018001444 A1 | 1/2018 |
| WO | 2019070237 A1 | 4/2019 |

* cited by examiner

*Primary Examiner* — Keith D Bloomquist
(74) *Attorney, Agent, or Firm* — Vivacqua Crane, PLLC

(57) ABSTRACT

A method for determining the route of a vehicle includes receiving, by a vehicle controller of a host vehicle, traffic-light data, map data, and vehicle-telemetry data. Further, the method includes identifying instances of chain waiting along the plurality of routes in the predetermined area using the traffic-light data and the vehicle-telemetry data and determining the fastest route of the plurality of routes to travel from a starting point to an end point within the predetermined area using the map data, the instances of chain waiting along the plurality of routes, the vehicle-telemetry data, and the traffic-light data.

8 Claims, 2 Drawing Sheets

ROUTING WITH TRAFFIC LIGHT INFORMATION

INTRODUCTION

The present disclosure relates to a system and method for determining a vehicle route using traffic light timing and phase information.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, there are method for determining a route for a vehicle. These methods, however, do not consider traffic light timing and phase information. It is therefore desirable to develop a method for determining a vehicle route that considers traffic light timing and phase information.

SUMMARY

The present disclosure describes a method for determining the route of a vehicle. The method includes receiving, by a vehicle controller of a host vehicle or a remote server (e.g., cloud server), traffic-light data. The traffic-light data includes timing information and phase information about a plurality of traffic lights in a predetermined area. The method further includes receiving, by the vehicle controller, map data. The map data includes a map of the predetermined area. The map includes a plurality of routes in the predetermined area. The method further includes receiving, by the vehicle controller, vehicle-telemetry data. The vehicle-telemetry data includes vehicle speed and vehicle location of a plurality of remote vehicles traveling along the plurality of routes in the predetermined area. The vehicle-telemetry data is indicative of a real-time traffic flow along the plurality of routes in the predetermined area. The method includes identifying instances of chain waiting along the plurality of routes in the predetermined area using the traffic-light data and the vehicle-telemetry data and determining the best route of the plurality of routes to travel from a starting point to an end point within the predetermined area using the map data, the instances of chain waiting along the plurality of routes, the vehicle-telemetry data, and the traffic-light data. The method further includes controlling the host vehicle considering the fastest route to travel from the starting point to the end point within the predetermined area. The method described in this paragraph improves vehicle technology by minimizing stopping duration at traffic lights, thereby minimizing overall travel time of the vehicle.

Implementations may include one or more of the following features. The method may also include determining the fastest route of the plurality of routes to travel from a starting point to an end point within the predetermined area using the map data, the instances of chain waiting along the plurality of routes, the vehicle-telemetry data, and the traffic-light data; and controlling the host vehicle considering the fastest route to travel from the starting point. The instances of chain waiting are instances where the host vehicle has to wait at least one of plurality of traffic lights after traveling through another one of the plurality of traffic lights. The method further includes measuring a plurality of distances of route segments from a first traffic light to a second traffic light. The plurality of traffic lights includes the first traffic light, the second traffic light, and a plurality of intermediate traffic lights between the first traffic light and the second traffic light. The method further includes determining a total travel time from the first traffic light to the second traffic light using the plurality of distances of route segments from the first traffic light and the second traffic light. The method includes determining whether the host vehicle will reach the second traffic light at a red-light duration of the second traffic light based on the total time travel from the first traffic light to the second traffic light. Also, the method includes determining that one of the instances of chain waiting occurs at the second traffic light in response to determining that the host vehicle will reach the second traffic light at a red-light duration of the second traffic. The total travel time from the first traffic light to the second traffic light is based, at least in part, on a speed profile of the real-time traffic flow.

The red-light duration may include a confidence interval. The method may include modeling a trip from the starting point to the end point as a sequence of location pairs identified by instances of chain waiting. The method may include using a weighted function with a plurality of weight factors. The plurality of weight factors includes a traffic-light waiting time weight factor. The method may include determining the traffic-light waiting time. The method may include determining the traffic-light waiting time weight factor for each of the plurality of routes. The traffic-light waiting time weight factor for each of the plurality of routes may be equal to a traffic-light waiting time divided by a theoretical travel time that does not take into consideration the traffic-light waiting time. The plurality of weight factors includes a regularization weight factor. The regularization weight factor is a function of a speed limit along the route from starting point to the end point and/or the shortest distance from the starting point to the end point and a minimum travel time from the starting point to the end point. Implementations of the described techniques may include hardware, a method or process, or computer software on a computer-accessible medium.

The present disclosure further describes a system for determining a route. The system includes a plurality of sensors and a controller in communication with the sensors. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
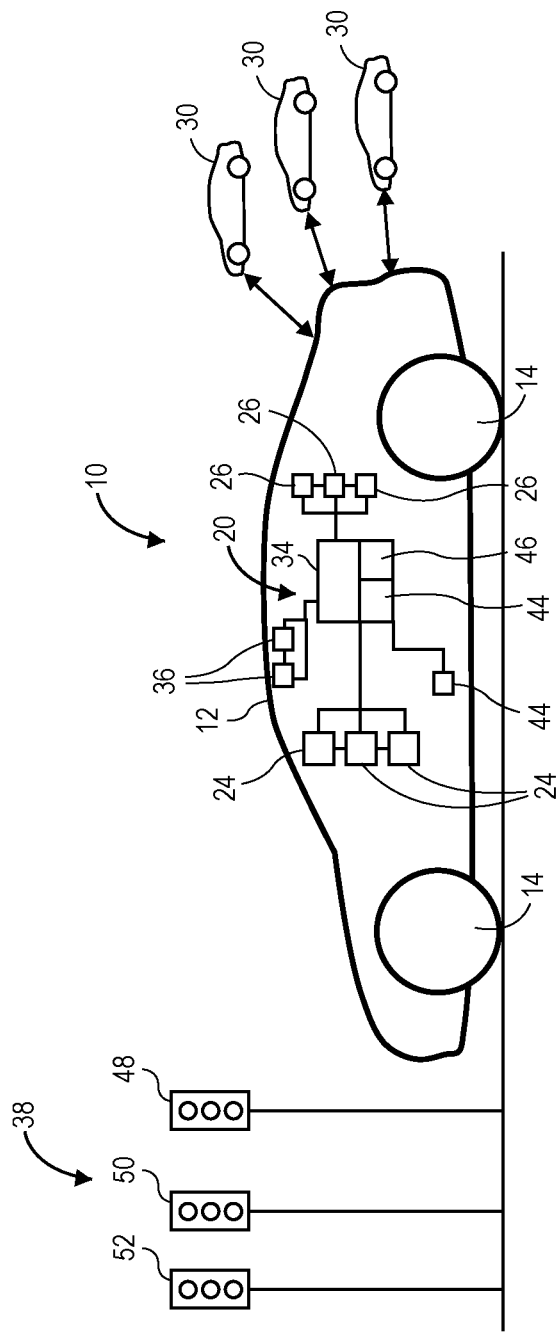
FIG. 1 is a schematic diagram of a vehicle including a system for determining a route.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a body 12 and a plurality of wheels 14 coupled to the body 12. The host vehicle 10 may be an autonomous vehicle. In the depicted embodiment, the host vehicle 10 is depicted in the illustrated embodiment as a sedan, but it should be appreciated that other vehicles including trucks, coupes, sport utility vehicles (SUVs), recreational vehicles (RVs), etc., may also be used.

The host vehicle 10 further includes one or more sensors 24 coupled to the body 12. The sensors 24 sense observable conditions of the exterior environment and/or the interior environment of the vehicle 10. As non-limiting examples, the sensors 24 may include one or more cameras, one or more light detection and ranging (LIDAR) sensors, one or more proximity sensors, one or more cameras, one or more ultrasonic sensors, one or more thermal imaging sensors, and/or other sensors. Each sensor 24 is configured to generate a signal that is indicative of the sensed observable conditions (i.e., sensor data) of the exterior environment and/or the interior environment of the vehicle 10.

The vehicle 10 includes a vehicle controller 34 in communication with the sensors 24. The vehicle controller 34 includes at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10. The vehicle controller 34 of the vehicle 10 may be programmed to execute the method 100 (FIG. 2) as described in detail below.

The instructions may include one or more separate programs, each of which comprises an ordered listing of executable instructions for implementing logical functions. The instructions, when executed by the vehicle processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single vehicle controller 34 is shown in FIG. 1, embodiments of the vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the vehicle 10. The vehicle controller 34 is part of a system 20 for determining a vehicle route using traffic light timing and phase information.

The host vehicle 10 further includes one or more vehicle transceivers 36 in communication with the vehicle controller 34. Each of the vehicle transceivers 36 is configured to wirelessly communicate information to and from other entities using, for example, Vehicle-to-everything (V2X) technology. As non-limiting examples, the vehicle transceivers 36 may transmit and/or receive information from other vehicles ("V2V" communication), infrastructure ("V2I" communication), remote systems at a remote call center (e.g., ON-STAR by GENERAL MOTORS) and/or personal electronic devices, such as a mobile phone. In certain embodiments, the vehicle transceivers 36 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The host vehicle 10 further includes one or more actuators 26 in communication with the vehicle controller 34. The actuators 26 control one or more vehicle features such as, but not limited to, the propulsion system, the transmission system, the steering system, and the brake system of the host vehicle 10. In various embodiments, the vehicle features may further include interior and/or exterior vehicle features such as, but are not limited to, doors, a trunk, and cabin features such as air, music, lighting, etc.

The host vehicle 10 includes a user interface 23, which may be a touchscreen in the dashboard. The user interface 23 may include, but is not limited to, an alarm, such as one or more speakers to provide an audible sound, haptic feedback in a vehicle seat or other object, one or more displays, one or more microphones (e.g., a microphone array) and/or other devices suitable to provide a notification to the vehicle user of the host vehicle 10. The user interface 23 is in electronic communication with the vehicle controller 34 and is configured to receive inputs by a vehicle occupant (e.g., a vehicle operator or a vehicle passenger). For example, the user interface 23 may include a touch screen and/or buttons configured to receive inputs from a person. Accordingly, the controller 34 is configured to receive inputs from the user via the user interface 23.

Figure 2:
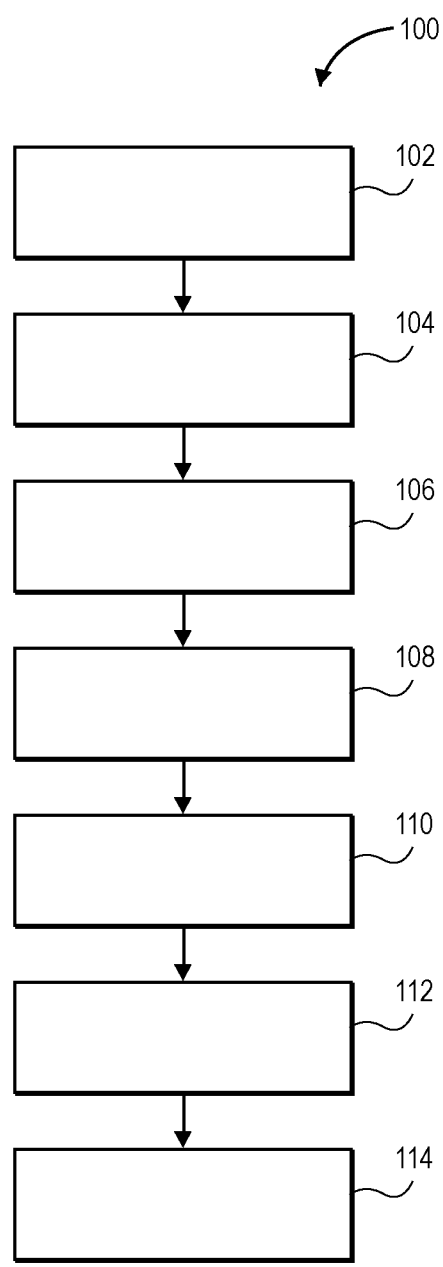
FIG. 2 is a flowchart of a method for determining a route.

FIG. 2 is a flowchart of a method 100 for determining a vehicle route using traffic light timing and phase information. The method 100 begins at block 102. At block 102, the vehicle controller 34 receives a route request from the vehicle user. A route request is a request for the vehicle controller 34 to determine a route from a starting point to an end point. While calculating routes locally using vehicle's local computation is possible, the remote server (e.g., cloud server) may calculate the route because the traffic light information and vehicle speed profiles are dynamic information. The end point is a destination, which may be a user input. The starting point may be determined by a GPS system of the host vehicle 10. Further, at block 102, the vehicle controller 34 receives traffic light data in real-time. The traffic-light data includes timing information and phase (e.g., red, yellow, and green phases) information about a plurality of traffic lights in a predetermined area around the host vehicle 10. The traffic-light data may originate from traffic-light authorities, such as government agencies, and/or a privately-owned remote server. Next, the method 100 proceeds to block 104.

At block 104, the vehicle controller 34 receives vehicle-telemetry data from other vehicles (i.e., remote vehicles 30). The vehicle-telemetry data includes vehicle speed, vehicle acceleration, vehicle deceleration, and vehicle location of a plurality of remote vehicles 30 traveling along a plurality of routes in the predetermined area around the location of the host vehicle 10. The vehicle-telemetry data is indicative of a real-time traffic flow along the plurality of routes in the predetermined area. Further, the method 100 continues to block 106.

At block 106, the vehicle controller 34 receives map data. The map data includes a map of the predetermined area around the location of the host vehicle 10. The map includes a plurality of routes in the predetermined area around the location of the host vehicle 10. Next, the method 100 continues to block 108.

At block 108, the vehicle controller 34 determines (e.g., estimates) the travel time for various routes to travel from a starting point to an end point within the predetermined area using the map data, the vehicle telemetry data, and the traffic-light data. To do so, the vehicle controller 34 identifies instances of chain waiting along the plurality of routes in the predetermined area using the traffic-light data, the vehicle-telemetry data, and the map data. The instances of chain waiting are instances where the host vehicle 10 has to wait at least one of the traffic lights 38 after traveling through another one of the traffic lights 38. After a vehicle 10 finishes waiting for its current traffic light red light, the vehicle 10 starts to move again, then it has to wait at least another traffic light with high likelihood. In the depicted embodiment, the traffic light 38 includes a first traffic light 48, a second traffic light 50, and third traffic light 52. It is contemplated, however, that there may be more or fewer traffic lights 38 along various routes from the starting point to the end point.

To identify instances of chain waiting, a route is divided by route segments. A route segment is between two traffic lights 38. No traffic light 38 is disposed within a route segment. Each route has a first traffic light 48 and a last traffic light (e.g., third traffic light 52). One or more traffic lights 38 (e.g., the second traffic light 50) may be positioned between the first traffic light 28 and the last traffic light (e.g., third traffic light 52) along the route and may be referred to as intermediate traffic lights 38. To identify instances of chain waiting, the distances of each route segments from the first traffic light 48 to the last traffic light (e.g., third traffic light 52) are measured. To do so, the distance from the from the first traffic light 48 to the last traffic light (e.g., third traffic light 52) are measured and then this distance is divided by the number of intermediate traffic lights 38 between the first traffic light 48 to the last traffic light (e.g., third traffic light 52). The distance from the from the first traffic light 48 to the last traffic light (e.g., third traffic light 52) may be expressed as follows:

$$D = [d_0, d_1, d_2, \ldots]$$

where:

D is the distance from the from the first traffic light 48 to the last traffic light (e.g., third traffic light 52) along a route from a starting point to the end point;

$d_0$ is the distance of a first route segment of the route from a starting point to the end point;

$d_1$ is the distance of a second route segment of the route from a starting point to the end point; and $d^2$ is the distance of a second route segment of the route from a starting point to the end point.

Then, a total travel time for traveling along the route from the starting point to the end point is determined using the following equation:

$$T_{total} = t_{acc} + t_{dec} + \left(\sum D - d_{acc} - d_{dec}\right)/s_{stable}$$

$T_{total}$ is the total travel time for traveling along the route from the starting point to the end point;

$t_{acc}$ is the acceleration time of the host vehicle 10 after stopping at a red traffic light 38;

$t_{dec}$ is the deceleration time of the host vehicle 10 while decelerating because of a red traffic light 38;

D is the distance from the from the first traffic light 48 to the last traffic light (e.g., third traffic light 52) along a route from a starting point to the end point;

$d_{acc}$ is the distance travelled by the host vehicle 10 during the acceleration time;

$d_{dec}$ is the distance travelled by the host vehicle 10 during the deceleration time; and $s_{stable}$ is the speed of the host vehicle 10 while traveling at a constant speed (without accelerating or decelerating).

The vehicle controller 34 then determines if the current time plus the total travel time for traveling along the route from the starting point to the end point falls within a predetermined time range, which is a red-light duration. The red-light duration is the time interval at which the last traffic light 38 along the route will be red. Thus, the vehicle controller 34 determines whether the host vehicle 10 will reach the last traffic light 38 (or another traffic light 38) along the route during the red-light duration of that traffic light 38. If the host vehicle 10 will reach the last traffic light (or another traffic light 38) along the route during the red-light duration, then an instance of chain waiting is detected.

The vehicle controller 34 also uses a congestion model to determine the time it will take the host vehicle 10 to the total travel from the first traffic light 48 to the second traffic light 50. The congestion model is defined as follows:

$$t = \sum_{i=1}^{n} \frac{d}{s_i}$$

t is the total travel time it will take the host vehicle 10 to travel from the first traffic light 38 to the second traffic light 50;

i is an index indicative of the number of mini-route segments within each route segment along the route, wherein there are not traffic lights 38 within the route segments, and each route segments begins at a traffic light 38 and ends at another traffic light 38;

n is the total number of mini-route segments along the route;

d is the distance of each of the mini-route segments; and $s_i$ is the speed profile of the real-time traffic flow along each mini-route segments.

The speed profile of the real-time traffic flow may be obtained from infrastructure sensing, the vehicle-telemetry data, and/or through crowdsourcing via smart devices (e.g., smart phones, smart tablets, etc.). Because the total travel time it will take the host vehicle 10 to travel from the first traffic light 38 to the second traffic light 50 is an estimation, a confidence interval (e.g., 90%) is assigned to this total travel time. The confidence interval may be a time width (i.e., total travel time±confidence interval). Thus, the red-light duration includes a confidence interval.

After block 108, the method 100 proceeds to block 110. At block 110, the vehicle controller 34 determines (e.g., calculates) the weight factors for the route determination. A trip from the starting point to the end point may be modelled as a sequence of location pairs identified by instances of chain waiting. The route may be determined (e.g., calculated) using suitable routing algorithms, such as the Dijkstra's algorithm, the A* search algorithm, a contraction hierarchies algorithm, etc. These routing algorithms determine the shortest path from the starting point to the end points on a map with respect to a weighting function. In the present disclosure, the weighting function considers the traffic-light data and a congestion data as determined by the congestion model. Thus, a traffic-light waiting time weight factor is determined for each of the plurality of routes from the starting point to the end point. The traffic-light waiting time weight factor for each of the plurality of routes is equal to a traffic-light waiting time divided by a theoretical travel time that does not take into consideration the traffic-light waiting time as expressed by the following equation:

$$W'_{A,B} = \frac{TFL \text{ waiting time}}{\text{Theoretical travel time}}$$

where:
$W'_{A,B}$ is the traffic-light waiting time weight factor;
TFL waiting time is time that the host vehicle 10 will wait at a traffic light 18 along a specific route from the starting point to the end point; and
Theoretical travel time is the time that it takes the host vehicle 10 to travel along the specific route from the starting point to the end point without considering the traffic-light waiting time.

Other traffic-light related weighting factors may be considered. As non-limiting examples, these additional traffic-light related weighting factors may include minimum traffic-light waiting time, minimum number of traffic-light waiting instances, inter-distance between traffic-light waiting instances, percentage of traffic lights 38 with dynamic timing, red-light duration before arrival at the traffic light 38, passing through time before a traffic light becomes red, unstable inter-traffic light traveling speed, phase split, signal preemption, and activity profile.

The weighting factor for the routing algorithm may be expressed as follows:

$$W_{A,B} = \lambda W^0_{A,B} + (1-\lambda)W'_{A,B} + W^{reg}$$

where:
$W_{A,B}$ is the weight factor for the routing algorithm that considers the traffic-light data;
$W'_{A,B}$ is the traffic-light waiting time weight factor;
$W_{A,B}^0$ the weight factor for the routing algorithm that does not consider the traffic-light data;
$\lambda$ is a predetermined user-adjusted value; and
$W^{reg}$ is a regularization weight factor.

The regularization weight factor is a function of a speed limit along the route from starting point to the end point and prevents the routing algorithm from frequently directing vehicles 10 to roads that have no traffic lights (e.g., residential roads). The regularization weight factor may be expressed as follows:

$$W^{reg} = \max\left(\frac{t_{shortest}}{t_{cur}}, \frac{d_{shortest}}{d_{cur}}\right) \times \frac{S_{cur\_stable\_spd}}{S_{spd\_limit}}$$

where:
$W^{reg}$ is a regularization weight factor;
$t_{shortest}$ is a minimum travel time from the starting point to the end point based on them map data without considering the traffic-light data;
$d_{shortest}$ is a shortest travel distance from the starting point to the end point based on them map data without considering the traffic-light data;
$t_{cur}$ is the total travel time described above (from the starting point to the end point), which considers the traffic lights 38.
$d_{cur}$ is the distance from the starting point to the end point, which considers the traffic lights 38;
$S_{spd\_limit}$ is the speed limit along the route from starting point to the end point;
$S_{cur\_stable\_speed}$ is the current stable travel speed of the host vehicle 10.

If the travel time or distance varies a lot, the weight factors regarding the traffic lights 38 will be weakened. If the current stable travel speed is far below the speed limits, the weight factors regarding the traffic lights 38 will become more important, allowing the routing algorithm to find alternative routes. After block 110, the method 100 proceeds to block 112.

At block 112, a suitable routing algorithms (e.g., Dijkstra's algorithm, the A* search algorithm, a contraction hierarchies algorithm) uses the weight factor considers the traffic-light data (i.e., $W_{A,B}$) to determine the fastest route of the plurality of routes to travel from the starting point to end point within the predetermined area using the map data, the instances of chain waiting along the plurality of routes, the vehicle-telemetry data, and the traffic-light data. Then, the method 100 proceeds to block 114.

At block 114, the vehicle controller 34 controls the host vehicle 10 taking into account the fastest route to travel from the starting point to the end point within the predetermined area. For instance, the host vehicle 10 may be an autonomous vehicle. If the host vehicle 10 is an autonomous vehicle, the vehicle controller 34 commands the host vehicle 10 to travel along the fastest route from the starting point to the end point. Additionally, or alternatively, the vehicle controller 34 may command a user interface 23 to display the fastest route to travel from the starting point to the end point and provide instructions to follow such route.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A method for determining a route, comprising:
   receiving traffic-light data, wherein traffic-light data includes timing information and phase information about a plurality of traffic lights in a predetermined area;
   receiving map data, wherein the map data includes a map of the predetermined area, the map includes a plurality of routes in the predetermined area;
   receiving vehicle-telemetry data, wherein the vehicle-telemetry data includes vehicle speed and vehicle location of a plurality of remote vehicles traveling along the plurality of routes in the predetermined area, and the vehicle-telemetry data is indicative of a real-time traffic flow along the plurality of routes in the predetermined area;
   identifying instances of chain waiting along the plurality of routes in the predetermined area using the traffic-light data and the vehicle-telemetry data, wherein the instances of chain waiting are instances where a host vehicle has to wait at least one of the plurality of traffic lights after traveling through another one of the plurality of traffic lights; and
   determining a fastest route of the plurality of routes to travel from a starting point to an end point within the predetermined area using the map data, the instances of chain waiting along the plurality of routes, the vehicle-telemetry data, and the traffic-light data;
   wherein determining the instances of chain waiting along the plurality of routes in the predetermined area using the traffic-light data and the vehicle-telemetry data includes:
      measuring a plurality of distances of route segments from a first traffic light to a second traffic light, wherein the plurality of traffic lights includes the first traffic light, the second traffic light, and a plurality of intermediate traffic lights between the first traffic light and the second traffic light;
      determining a total travel time from the first traffic light to the second traffic light using the plurality of distances of route segments from the first traffic light and the second traffic light;
      determining whether the host vehicle will reach the second traffic light at a red-light duration of the second traffic light based on the total time travel from the first traffic light to the second traffic light, wherein the total travel time from the first traffic light to the second traffic light is based, at least in part, on a speed profile of the real-time traffic flow, and wherein the red-light duration includes a confidence interval; and
      determining that one of the instances of chain waiting occurs at the second traffic light in response to determining that the host vehicle will reach the second traffic light at a red-light duration of the second traffic light;
   wherein the total travel time from the first traffic light to the second traffic light is based, at least in part, on a speed profile of the real-time traffic flow;
   wherein the red-light duration includes a confidence interval, modeling a trip from the starting point to the end point as a sequence of location pairs identified by instances of chain waiting;

wherein determining the fastest route of the plurality of routes to travel from a starting point to an end point includes using a weighted function with a plurality of weight factors, the plurality of weight factors includes a traffic-light waiting time weight factor;

determining the traffic-light waiting time weight factor for each of the plurality of routes, and the traffic-light waiting time weight factor for each of the plurality of routes is equal to a traffic-light waiting time divided by a theoretical travel time that does not take into consideration the traffic-light waiting time;

wherein the plurality of weight factors includes a regularization weight factor, wherein the regularization weight factor is a function of a speed limit along the route from starting point to the end point;

wherein the regularization weight factor is a function of a shortest distance from the starting point to the end point and a minimum travel time from the starting point to the end point; and determining additional traffic-light related weighting factors, the additional weighting factors include minimum traffic-light waiting time, minimum number of traffic-light waiting instances, inter-distance between traffic-light waiting instances, percentage of traffic lights with dynamic timing, red-light duration before arrival at the traffic light, passing through time before a traffic light becomes red, unstable inter-traffic light traveling speed, phase split, signal preemption, and activity profile, and controlling the host vehicle taking into account the map data, the instances of chain waiting along the plurality of routes, the vehicle-telemetry data, and the traffic-light data, the fastest route to travel from the starting point to the end point within the predetermined area wherein the instances of chain waiting are instances where the host vehicle has to wait at least one of plurality of traffic lights after traveling through another one of the plurality of traffic lights.

2. A system for determining a route, comprising:
a plurality of sensors; and
a controller in communication with the plurality of sensors, wherein the controller is programmed to:
  receive traffic-light data, wherein traffic-light data includes timing information and phase information about a plurality of traffic lights in a predetermined area;
  receiving map data, wherein the map data includes a map of the predetermined area, the map includes a plurality of routes in the predetermined area;
  receive vehicle-telemetry data, wherein the vehicle-telemetry data includes vehicle speed and vehicle location of a plurality of remote vehicles traveling along the plurality of routes in the predetermined area, and the vehicle-telemetry data is indicative of a real-time traffic flow along the plurality of routes in the predetermined area;
  identifying instances of chain waiting along the plurality of routes in the predetermined area using the traffic-light data and the vehicle-telemetry data;
  determine a fastest route of the plurality of routes to travel from a starting point to an end point within the predetermined area using the map data, the instances of chain waiting along the plurality of routes, the vehicle-telemetry data, and the traffic-light data; and
  control the host vehicle taking into account the fastest route to travel from the starting point to the end point within the predetermined area,
  wherein determining the fastest route of the plurality of routes to travel from a starting point to an end point includes using a weighted function with a plurality of weight factors, the plurality of weight factors includes a traffic-light waiting time weight factor,
  wherein the plurality of weight factors includes a regularization weight factor, wherein the regularization weight factor is a function of a speed limit along the route from starting point to the end point, and
  wherein the regularization weight factor is a function of a shortest distance from the starting point to the end point and a minimum travel time from the starting point to the end point, the method further includes determining additional traffic-light related weighting factors, the additional weighting factors include minimum traffic-light waiting time, minimum number of traffic-light waiting instances, inter-distance between traffic-light waiting instances, percentage of traffic lights with dynamic timing, red-light duration before arrival at the traffic light, passing through time before a traffic light becomes red, unstable inter-traffic light traveling speed, phase split, signal preemption, and activity profile.

3. The system of claim 2, wherein the instances of chain waiting are instances where the host vehicle has to wait at least one of plurality of traffic lights after traveling through another one of the plurality of traffic lights.

4. The system of claim 3, wherein determining the instances of chain waiting along the plurality of routes in the predetermined area using the traffic-light data and the vehicle-telemetry data includes:
  measure a plurality of distances of route segments from a first traffic light to a second traffic light, wherein the plurality of traffic lights includes the first traffic light, the second traffic light, and a plurality of intermediate traffic lights between the first traffic light and the second traffic light;
  determine a total travel time from the first traffic light to the second traffic light using the plurality of distances of route segments from the first traffic light and the second traffic light;
  determine whether the host vehicle will reach the second traffic light at a red-light duration of the second traffic light based on the total time travel from the first traffic light to the second traffic light; and
  determine that one of the instances of chain waiting occurs at the second traffic light in response to determining that the host vehicle will reach the second traffic light at a red-light duration of the second traffic light.

5. The system of claim 4, wherein the total travel time from the first traffic light to the second traffic light is based, at least in part, on a speed profile of the real-time traffic flow.

6. The system of claim 5, wherein the red-light duration includes a confidence interval.

7. The system of claim 6, further comprising modeling a trip from the starting point to the end point as a sequence of location pairs identified by instances of chain waiting.

8. The system of claim 2, further comprising determining the traffic-light waiting time weight factor for each of the plurality of routes, and the traffic-light waiting time weight factor for each of the plurality of routes is equal to a traffic-light waiting time divided by a theoretical travel time that does not take into consideration the traffic-light waiting time.

* * * * *